United States Patent [19]

Plockl

[11] 3,823,326

[45] July 9, 1974

[54] METHOD OF AND APPARATUS FOR READING INFORMATION CONTAINED IN CODED FORM

[75] Inventor: Johann Plockl, Unterhaching, Germany

[73] Assignee: Sick, Erwin, Optik-Elektronik, Waldkirch, Germany

[22] Filed: Mar. 16, 1973

[21] Appl. No.: 342,250

[30] Foreign Application Priority Data

Mar. 24, 1972 Germany.......................... 2214386

Sept. 15, 1972 Germany.......................... 2245235

[52] U.S. Cl..... 250/568, 340/146.3 AH, 250/223 R

[51] Int. Cl.............................................. G08c 9/06

[58] Field of Search.. 250/219 D, 219 DC, 219 DD, 250/217 CR, 223 R, 202, 567, 568, 569, 570, 555; 235/61.11 E; 340/146.3 K, 146.3 Z, 146.3 AH

[56] References Cited

UNITED STATES PATENTS

| | | | |
|---|---|---|---|
| 2,974,254 | 3/1961 | Fitzmaurice et al. | 250/217 CR X |
| 3,050,711 | 8/1962 | Harmon | 250/567 X |
| 3,529,084 | 9/1970 | Rilh | 250/202 X |
| 3,558,889 | 1/1971 | Morgan | 250/219 D |
| 3,643,068 | 2/1972 | Mohan et al. | 235/61.11 E |

*Primary Examiner*—Walter Stolwein

*Attorney, Agent, or Firm*—Cushman, Darby & Cushman

[57] ABSTRACT

Information provided in the form of a linear code of light and dark regions is provided on an information carrier and the carrier is passed through the path of a circulating light beam which is reflected by the code to a photo-electric transducer providing an output to an electronic discriminating processing system which is programmed to identify the code.

11 Claims, 6 Drawing Figures

METHOD OF AND APPARATUS FOR READING INFORMATION CONTAINED IN CODED FORM

BACKGROUND OF THE INVENTION

A method of such a kind has previously been proposed for scanning band-like information carriers affixed to railway cars. In this proposed method the information carriers pass the scanning system in a predetermined position and they need therefore be legible in one direction only.

However, if such information carriers are attached to goods of diverse kinds, for instance to goods for the retail trade, then it is in practice impossible without the use of very sophisticated and expensive devices to convey the information carriers attached to the goods past a reading head in such a way that the carriers are all oriented in one and the same way. For this reason it has also been proposed to make use of circular information carriers. In this proposed arrangement the information is contained in a code in the form of concentric rings of varying width and varying radial spacing. The code can be read along any radius of the carrier which coincides with its direction of motion. Owing to their circular shape these information carriers must be fairly large if they are to provide a specified degree of resolution.

OBJECTS OF THE INVENTION

The present invention has for its object the provision of an improved method of reading information provided in coded form on an information carrier irrespective of the orientation of the carrier.

It is another object of the invention to provide an apparatus for carrying out the method.

SUMMARY OF THE INVENTION

A code is read in a reading plane irrespectively of the orientation of the carriers, by scanning with at least one light spot travelling in a circle of a diameter exceeding the length of the code in a direction in which it is to be read, the position of the scanning circle in the reading plane after each circular sweep unidirectionally shifting a distance which is less than the width of the elements of the code measured across the direction in which they are to be read, whilst at the same time the information carrier traverses the reading plane across the direction of shift of the scanning circle at a speed which is slow in relation to the speed of the light spot.

In other words, at least one light spot is so controlled that it travels around a circle which shifts in a straight line in the direction of a diameter. If the information carrier traverses the reading plane across the direction of shift of the circular sweeps of the light spot, then each row of the code will be scanned at least once in the direction in which it is to be read. This can be reliably achieved if the speed of travel in the direction of shift of the circle swept by the light spot is slow in relation to the scanning speed of the light spot itself. It will then be possible to scan information carriers attached to goods whilst these are being conveyed on a belt or slide down a chute.

Although the light spot scans the code in reading direction in a circular arc, the deviation of the arc from a straight line can be reduced sufficiently for the difference to be neglected by making the diameter of the circular sweeps sufficiently large in relation to the length of the code.

In the simplest embodiment of the invention the proposed method permits information in the form of a code consisting of a single row of bars to be scanned by one light spot.

However, it is desirable to accommodate the required information on as small as possible a surface area, firstly in order to permit goods of small size to be provided with information carriers and secondly to enable the reading device to be as compact as possible. This can be achieved by arranging the elements of the code in several parallel rows, for instance each in the form of a sequence of bars or of some other light-and-dark code. If the code is arranged in a square a given amount of information can be accommodated on a particularly small surface area. In a further embodiment of the invention codes consisting of two or more parallel rows of code elements can be read by several light spots travelling in the reading plane in concentric circles radially spaced in accordance with the width of the code elements measured across the direction in which the code is to be read, the scanning circles jointly shifting in the reading plane after each circular sweep.

In other words, in such a case each of several light spots travelling in the reading plane in concentric circles will scan one of the rows of code elements when these arrive in a suitable position. The information contained in each row of the code being fed to the electronic processing system.

Moreover, according to another feature of the invention the number of light spots may be equal to the number of rows in the code. In the course of one circular sweep of the light spots all the rows of the code will thus be scanned. If the method is performed in this way the transverse spacing of the rows of the code may be different, provided the radial distances between the scanning circles are chosen accordingly.

According to yet another feature of the invention the number of light spots may exceed the number of rows in the code. In such a case the code is read by all the rows of the code being longitudinally scanned by light spots, except for one light spot which does not cross a code. This embodiment of the method has the advantage that the speed of travel of the information carrier may be relatively high, but at the cost of a slight additional complication in apparatus.

An alternative embodiment of the invention consists in providing fewer light spots than there are rows in the code. In such a case at least two circular sweeps will be needed for all the rows to be read. This arrangement will suggest itself as expedient when the speed of travel of the information carrier is likely to be slow and it is desired to save as much equipment as possible in the construction of the optico-mechanical part of the reading head.

It would be feasible to provide an arrangement in which all the light spots travelled on a common radius in such a way that several rows of a code were scanned simultaneously. However, this would involve providing as many photo-electric transducers as there are light spots. Moreover, precuations would have to be taken to ensure that the light reflected from each row was picked up substantially only by the associated transducer. However, it is nevertheless possible to use only one transducer, provided the several light spots are arranged to travel on different concentric circles spaced at angular intervals that are sufficiently wide to ensure that the arc lengths between the light spots exceed the maximum length of the code in reading direction.

The code could be designed to be read in four different directions but in such a case the information would have to be comprised four times in the code and four times the surface area would be required. To avoid this objection the invention proposes to include in the code information indicating the axis in which the code should be read (i.e. in the longitudinal axis of the rows and not across them). The processing system would then read only the results of the scan in the longitudinal axis of the rows of the code as indicated by the special information.

The code information in such an arrangement would have to be assembled only along the length of the rows and not across them. Furthermore, in order to avoid having to arrange the information comprised in the code so that it can be read in both hands, i.e. from left to right and conversely, at least one of the rows of the code may contain information indicating the correct reading direction of the rows, the processing system storing the results of the longitudinal scan of the rows of the code and then by reference to the directional information deciding from which end the stored code must be read. Even if each row is scanned by a light spot in only one direction and the code is legible in only one direction, the processing system will still be able to read the code because the information will first be stored. The stored information can be read in both directions and the discriminating processing system can then decide which one of the readings is sensible and makes use only of this reading.

DESCRIPTION OF THE PREFERRED EMBODIMENTS

Figure 1:
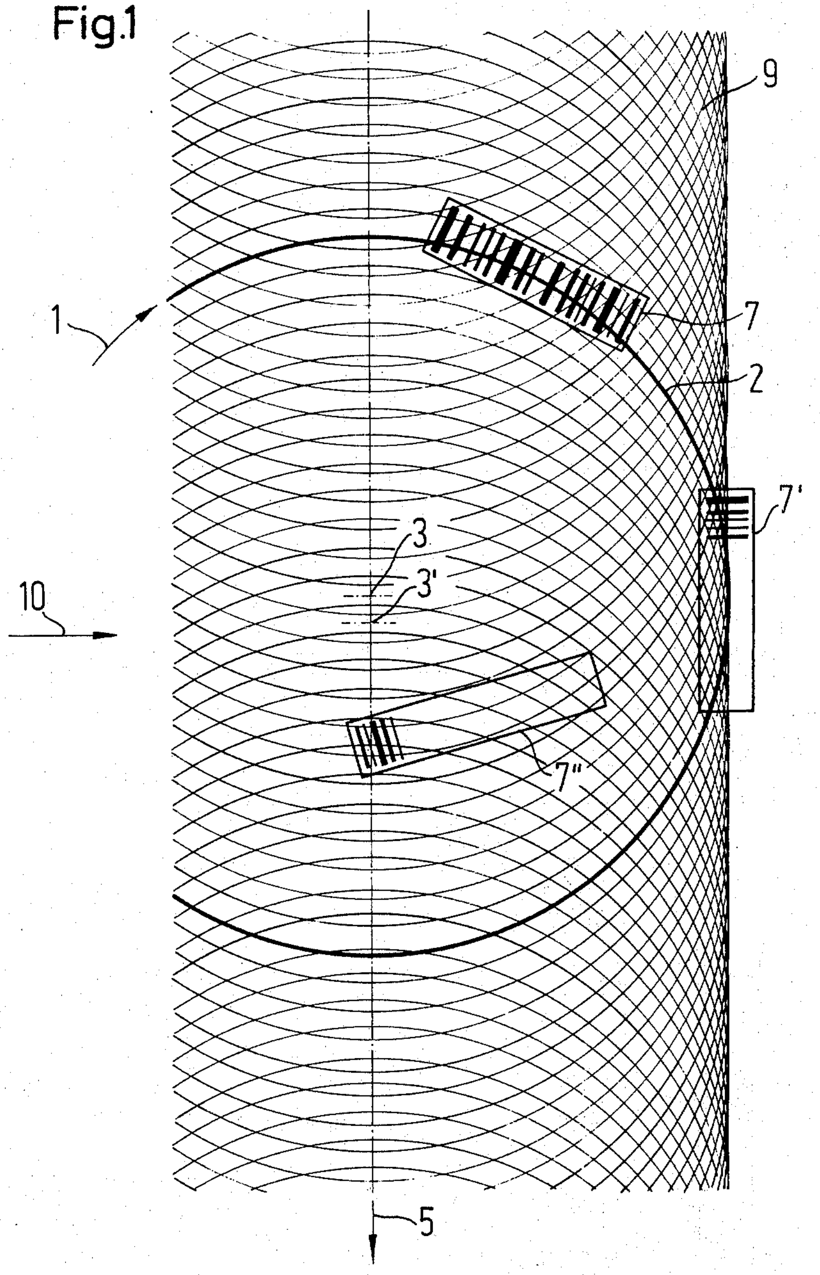
FIG. 1 illustrates diagrammatically the scanning of a single-row bar code by a single light spot, a portion of the scanning circles on the left being omitted although they must be understood as being present.

With reference to FIG. 1 a light spot must be thought to travel in consecutive circles in the direction indicated by an arrow 1, one such circle 2 having been picked out from the others by being drawn with a slightly thicker line. The centre of this circle 2 is at 3. When the light spot has completed its sweep around this circle the centre about which the light spot rotates is shifted in the direction of an arrow 5 to a fresh centre 3' so that the light spot will now travel around a fresh circle, and so forth. In practice it is more convenient that the centre about which the light spot rotates should move uniformly in the direction of the arrow 5.

An information carrier 7 which may be provided on or by a surface of, for example, an article of merchandise, which is to be read bars a code in the form of a linear sequence of bars. It does not matter whether only the width of the bars or only their spacing varies, or both. However, it is important that the information carrier should bear a code which must be read longitudinally.

It is also essential that the information carrier should move through the swept field in the direction indicated by the arrow 5 in which the scanning circles move, but it is not necessary that the two directions should be relatively perpendicular. Not excessively acute angles between the two directions are quite admissible.

FIG. 1 shows that the overall length of the information carriers 7, 7' and 7'' in different parts of the field is completely traversed from end to end by a part of a scanning circle. This requires the speed of travel of the light spot to be high compared with the speed of travel of the information carrier. If this is the case each information carrier will be completely scanned from end to end once in each direction (occasionally this may occur in parts of the scanning circles which are not shown on the left hand side of the drawing).

Figure 6:
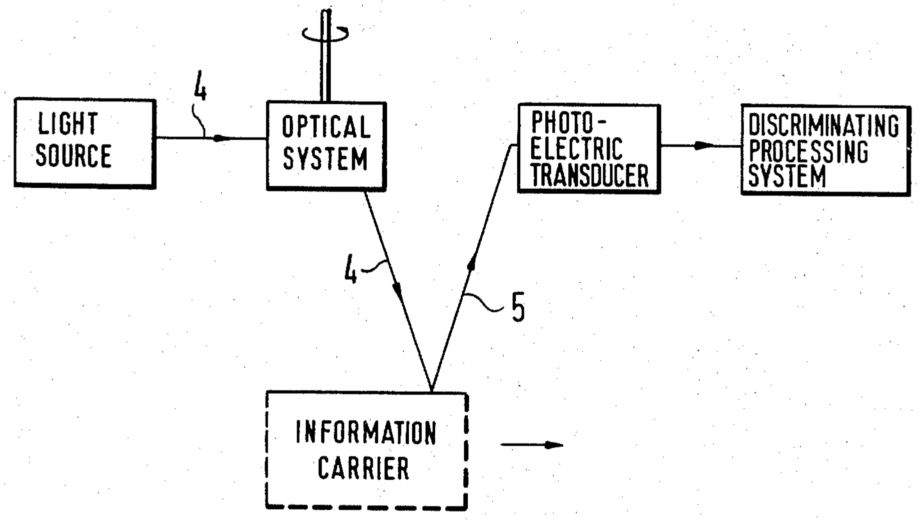
FIG. 6 is a schematic diagram of an apparatus according to the invention.

It is the function of an associated electronic discriminating processing system (see FIG. 6) to recognize when the light spot longitudinally (as distinct from transversely) traverses the entire length of the information carrier as well as when the scan is in the reading direction (i.e. forwards and not backwards). Also the pulses derived from the reflected light, indicated by the reference 5, must be converted to a signal form which the processing system can use.

The light spot may be provided by rotating a beam 4 emitted from a light source by means of a conventional optical system comprising for example prisms or mirrors in such a way that the light spot sweeps around in a circle. Moreover, the scanning circles can be arranged to traverse the reading plane for instance by reflecting the beam at a progressively tilting mirror provided for example by the aforesaid optical system.

In order to achieve the necessary resolution the beam may either be a pencil that is substantially thinner than the minimum width of a bar or than the minimum spacing of consecutive bars. This can always be achieved by using a laser beam. Alternatively the beam may be relatively wide and the necessary resolution will then be achieved by sufficiently fine scanning of an image of the information carrier.

Figure 2:
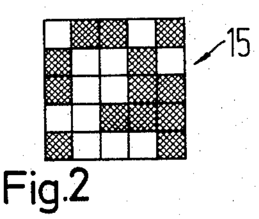
FIGS. 2 to 4 are illustrations of examples of multiple row codes which can be scanned by several light spots.

The code 15 shown in FIG. 2 is of checkerboard form, and the elements of the code are light and dark squares. The complete code is of square shape. The information is so contained in this code that the rows must all be read codirectionally, say from the left hand to the right.

Figure 3:
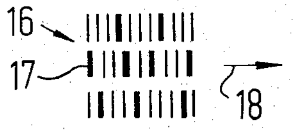

The code 16 in FIG. 3 comprises three individual bar codes 17, and all the bars must be read for instance in the direction of the arrow 18.

Figure 4:
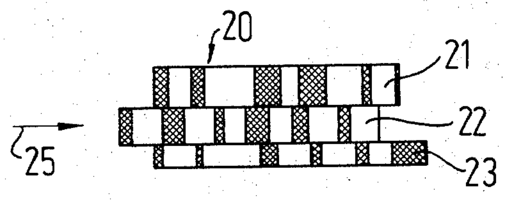

FIG. 4 is a very general case of a code 20 which can be read by a method and apparatus according to the invention. The code consists of three rows 21, 22 and 23 of different lengths and widths. Moreover, within each row the spacing of the code elements is different and the elements may partly overlap with elements in other rows. Such a code can be read only the longitudinal direction of the code rows, i.e. in the direction of the arrow 25.

Figure 5:
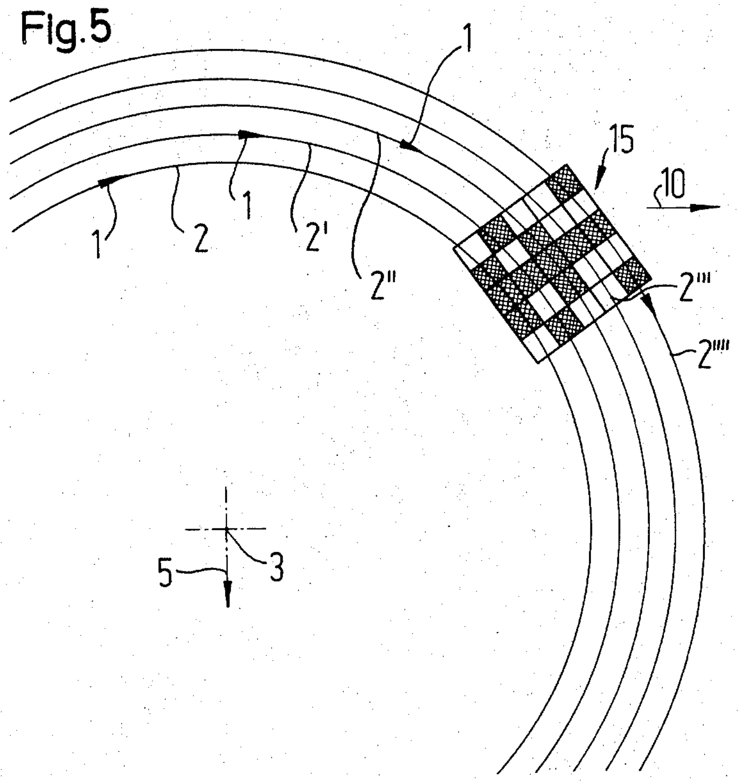
FIG. 5 illustrates the principle of a scanning system using a code shown in FIG. 2.

FIG. 5 exemplifies the reading of a checkerboard code 15 of the kind shown in FIG. 2. As before, the code moves in the reading plane in the direction of the arrow 10. Light spots here identified as 2, 2', 2'', 2''', 2'''' rotate about an axis which is normal to and extends through the plane of the drawing at 3. The light spots sweep out circles in the reading plane and they jointly advance in the direction indicated by the arrow 5. Because the information carrier, i.e. the code 15, moves in the reading plane and the circles are swept out in this plane the code 15 will at least once be in a position in which all the light spots scan the code in reading direction forwards or backwards. For the purpose of explanation this direction is assumed to be that shown in FIG. 5. It does not matter whether the code is scanned in the direction indicated by the arrows 1 or, when the information carrier is on the diametrically opposite side of the scanning circles about the axis 3, in the converse direction. When the information revealed by the scan has been stored the electronic processing system will determine by reference to directional information contained in the code from which hand the stored result should be read.

However, any readings of the code in a direction normal to that of the indicated reading direction gives no intelligible results. The processing system will therefore suppress them.

FIG. 5 shows that the light spots 2 to 2'''' are not located on a common radius, and the length of the arcs between them slightly exceeds the length of the code 15.

When the light spots are thus controlled only one photoelectric transducer (FIG. 6) will be required because the code can at any one time reflect only the light from one light spot.

In the case of a code as shown in FIG. 4 the length of the arcs separating the light spots would have to exceed the maximum length of this code. Moreover, the radial spacing of the scanning circles would have to be equal to the centre spacings of the code rows 21 to 23.

I claim:

1. A method of reading information presented in the form of a code of optically-contrasting regions on an information carrier, the method comprising the steps of:

scanning the regions in a reading plane with a light spot travelling along a circle of a diameter exceeding the length of the code in the direction in which it is to be read, the position of the scanning circle in the reading plane after each circular sweep being unidirectionally shifted a distance which is less than the width of the regions providing the code measured across the direction in which the code is to be read, whilst the information carrier traverses the reading plane across the direction of shift of the scanning circle at a speed which is slow in relation to the speed of the light spot;

converting the light reflected from the code into electrical signals in a photo-electric transducer;

and applying the output signals of the transducer to a discriminating processing system.

2. A method according to claim 1 wherein the optically contrasting regions are provided by light and dark regions.

3. A method according to claim 1 wherein the light spot scans a code comprising at least one row of spaced bars which provide darker regions than the background on which they are provided.

4. A method according to claim 1 wherein, for reading a code consisting of at least two parallel rows of code regions, several light spots are arranged to travel in the reading plane in concentric circles which are radially spaced in accordance with the width of the code regions measured across the direction in which the code is to be read, the scanning circles being jointly shifted in the reading plane after each circular sweep.

5. A method according to claim 4 wherein the number of light spots equals the number of rows in the code.

6. A method according to claim 4 wherein the number of light spots exceeds the number of rows in the code.

7. A method according to claim 4 wherein the number of light spots is less than the number of rows in the code.

8. A method according to claim 4 wherein the several light spots are arranged to travel in different concentric circles and are spaced at angular intervals that are sufficiently large to ensure that the arc lengths between the light spots exceed the maximum length of the code in the reading direction.

9. A method according to claim 1 wherein the code includes information indicating the direction in which the code should be read, and, according to this additional information, the processing system reads only the results of the scan in the longitudinal direction of the row or rows of the code.

10. A method according to claim 3, wherein the at least one row of the code includes information indicating the hand from which the at least one row is to be read, and the processing system stores the results of the longitudinal scan of the at least one row of the code and then by reference to the directional information computes from which end to read the code.

11. Apparatus for reading information presented in the form of a code of optically-contrasting regions on an information carrier, the apparatus comprising a light source; means whereby a light spot formed by a beam of light from the light source can be moved so that in a reading plane in which the code is presented the light spot describes a circular path of a diameter exceeding the length of the code in the direction in which it is to be read; means for unidirectionally shifting the circular path of the light spot after each circle is completed; means for traversing the information carrier past the path of the light spot; means for converting light reflected from the code, when the carrier traverses the path of the light spot into electrical signals, and discriminating means arranged to interpret the electrical signals according to the scanned code.

* * * * *